W. S. DORMAN.
BOLT FASTENER.
APPLICATION FILED APR. 5, 1910.
994,726.
Patented June 13, 1911.
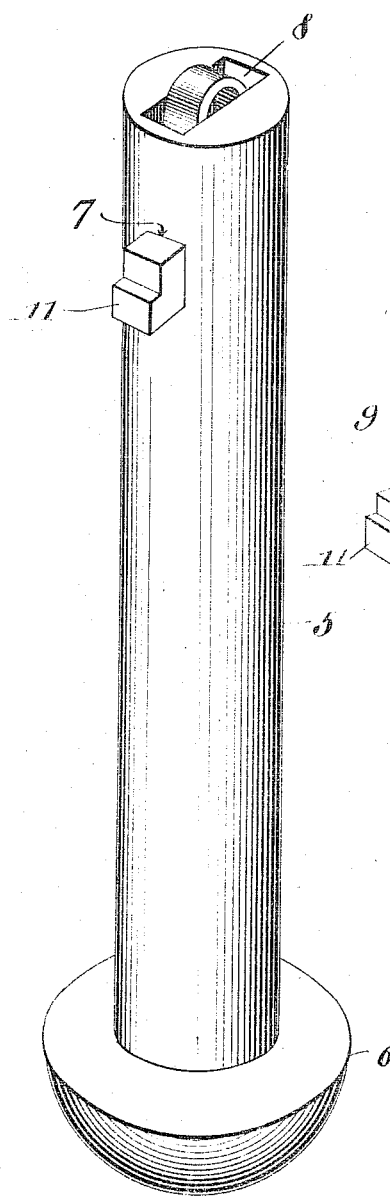
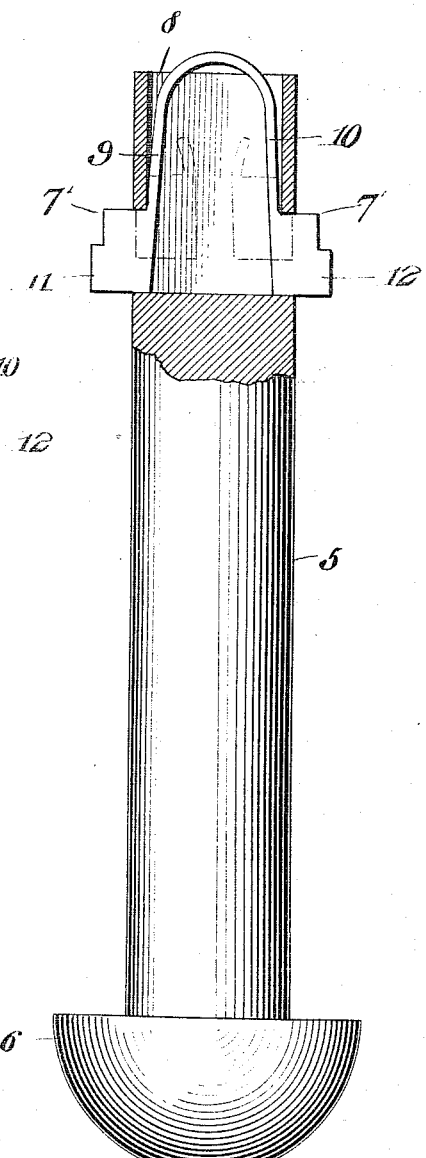
Witnesses
Inventor
Willis S. Dorman.
By Victor J. Evans.
Attorney

UNITED STATES PATENT OFFICE.

WILLIS S. DORMAN, OF LINTON, NORTH DAKOTA.

BOLT-FASTENER.

994,726.

Specification of Letters Patent. Patented June 13, 1911.

Application filed April 5, 1910. Serial No. 553,545.

*To all whom it may concern:*

Be it known that I, WILLIS S. DORMAN, a citizen of the United States, residing at Linton, in the county of Emmons and State of North Dakota, have invented new and useful Improvements in Bolt-Fasteners, of which the following is a specification.

This invention relates to improvements in bolt fasteners and has for one of its objects the provision of a means for securing a bolt against displacement without the employment of the usual nut.

A further object is the provision of a device which when a nut is used on a bolt will operate to prevent accidental disengagement of the nut from the bolt.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming a part of the specification;—Figure 1 is a detail perspective of the device. Fig. 2 is a vertical section taken through the bolt. Fig. 3 is a detail perspective of the fastener.

Similar numerals of reference are employed to designate corresponding parts throughout.

The bolt includes in its construction a shank portion designated by the numeral 5, the said shank terminating at one end in a head 6. Formed in the shank 5 and adjacent to the end thereof remote from the head 6 is a transverse opening 7 and extending inwardly from the extremity of the shank remote from the head 6 and communicating with the transverse opening 7 is a non-cylindrical axial bore 8.

The fastener is preferably formed of a single piece of resilient metal bent into substantially a U-shape, the opposite limbs of which are designated by the numerals 9 and 10. The width of the limbs 9 and 10 will be somewhat less than the width of the bore 8 and the length of said limbs will be a trifle greater than the length of the bore 8. Formed integral or otherwise secured to the free terminal portions of the limbs 9 and 10 and extending outwardly therefrom are a pair of lugs 11 and 12. The inner end portions of the outer faces of these lugs are transversely rabbeted as shown at 7', the depth of such rabbets corresponding approximately to the thickness of the wall of the bore 8. When the terminals of the limbs are forced together and bear one upon the other the distance between the opposite outer ends of the lugs 11 and 12 will be somewhat less than the length of the oblong bore 8 thus permitting the fastener to be bodily insertible into the bore. Normally the space between the terminals of the limbs 9 and 10, exclusive of the lugs 11 and 12 will be a trifle greater than the length of the oblong opening, so that after the fastener has been bodily inserted into the bore and the lugs 11 and 12 aline with the transverse opening 7, by virtue of their resiliency the fastener arms 9 and 10 will move outwardly and the lugs 11 and 12 will move through and beyond the opposite ends of the transverse opening 7. It will be evident when the parts are so positioned and assuming that the bolt has been inserted through an opening in an object and the inner faces of the lugs 11 and 12 bear on that face of the object opposite to the face on which the head 5 bears, that displacement of the bolt will be positively prevented. When for any reason it is desired to remove the bolt without completely withdrawing the fastener therefrom, the limbs 9 and 10 are sprung inwardly until the rabbeted portions 7' clear the ends of the openings 7, after which the fastener is pulled outwardly until the shoulders produced at the inner ends of the rabbets abut against the ends of the openings 7. When the parts are so positioned the portion of the outer surface of the lugs, beyond the rabbets, will be flush with the outer face of the bolt, thus permitting the latter to be withdrawn or inserted as the case may be.

With this construction it will be manifest that the function usually performed by a nut to retain a bolt within the opening of an object, will be equally as well performed by the fastener.

From the foregoing, it is evident that I have provided a device which is comparatively simple in structure and inexpensive in manufacture, embodying few parts and these so arranged that the danger of derangement will be reduced to a minimum.

I claim:—

As an article of manufacture a body provided at one end with a head and having adjacent to its opposite end a transverse opening, said body being further provided with an axial bore extending inwardly from the said opposite end and communicating with said transverse opening, and a U-shaped resilient fastener arranged in said bore having lugs extending outwardly from its opposite ends and projecting through the opposite ends of said transverse opening and having their outer faces transversely rabbeted for the purpose described.

In testimony whereof I affix my signature in presence of two witnesses.

WILLIS S. DORMAN.

Witnesses:
 EDWD. BRADDOCK,
 JOHN LIPP.